US005104430A

United States Patent [19]

Her-Mou

[11] Patent Number: 5,104,430

[45] Date of Patent: Apr. 14, 1992

[54] MASK WITH AN AIR FILTERING DEVICE

[76] Inventor: Lin Her-Mou, P.O. Box 82-144, Taipei, Taiwan

[21] Appl. No.: 712,488

[22] Filed: Jun. 11, 1991

[51] Int. Cl.[5] .............................................. B01D 50/00

[52] U.S. Cl. .................................... 55/385.1; 2/171.3; 128/205.29; 128/206.17; 55/414

[58] Field of Search ....................... 2/205, 171.3; 98/1; 55/385.1, 414; 128/205.29, 206.17

[56] References Cited

U.S. PATENT DOCUMENTS 3,963,021 6/1976 Bancroft ............................. 2/171.3

*Primary Examiner*—Bernard Nozick

*Attorney, Agent, or Firm*—Alfred Lei

[57] ABSTRACT

This invention relates to a mask with an air filtering device and in particular to one including a helmet adapted to a head of a user, a visor pivotally connected with a lower side of the helmet and having a soft pad for preventing air entering therein from outside, a filtering chamber having a blower driven by a dc motor and a filtering plate mounted between the blower and a cover of the filtering chamber, a pipe connected at one end with an outlet of the blower and extending at the other to space around mouth and nose of the user, a curved air guider for converging cleaned air into the space around the mouth and nose of the user and a check valve mounted on the soft pad for exhausting air exhaled by the user.

1 Claim, 7 Drawing Sheets

MASK WITH AN AIR FILTERING DEVICE

BACKGROUND OF THE INVENTION

It is found that the conventional mask simply utilizes a visor to separate the face of an user from the outside and enables air to flow in the nose of the user from the lower side of the visor. However, such mask has no filtering effect and cannot keep the user from being hurted by the polluted air. As to the cloth mask, it will obstruct the user from inhaling and exhaling normally thus making the user have a slight oxygenless sign.

Therefore, it is an object of the present invention to provide a mask which may obviate and mitigate the above-mentioned drawbacks.

SUMMARY OF THE INVENTION

This invention relates to a mask with an air filtering device.

It is the primary object of the present invention to provide a mask with an air filtering device which may effectively clean the air from outside.

It is another object of the present invention to provide a mask with an air filtering device which may enable the user to inhale and exhale normally.

It is still another object of the present invention to provide a mask with an air filtering device which is simple in construction.

It is still another object of the present invention to provide a mask with an air filtering device which is economic to produce.

It is a further object of the present invention to provide a mask with an air filtering device which is fit for mass production.

Other objects and merits and a fuller understanding of the present invention will be obtained by those having ordinary skill in the art when the following detailed description of the preferred embodiment is read in conjunction with the accompanying drawings.

DETAILED DESCRIPTION OF THE PREFERRED EMBODIMENT

Figure 1:
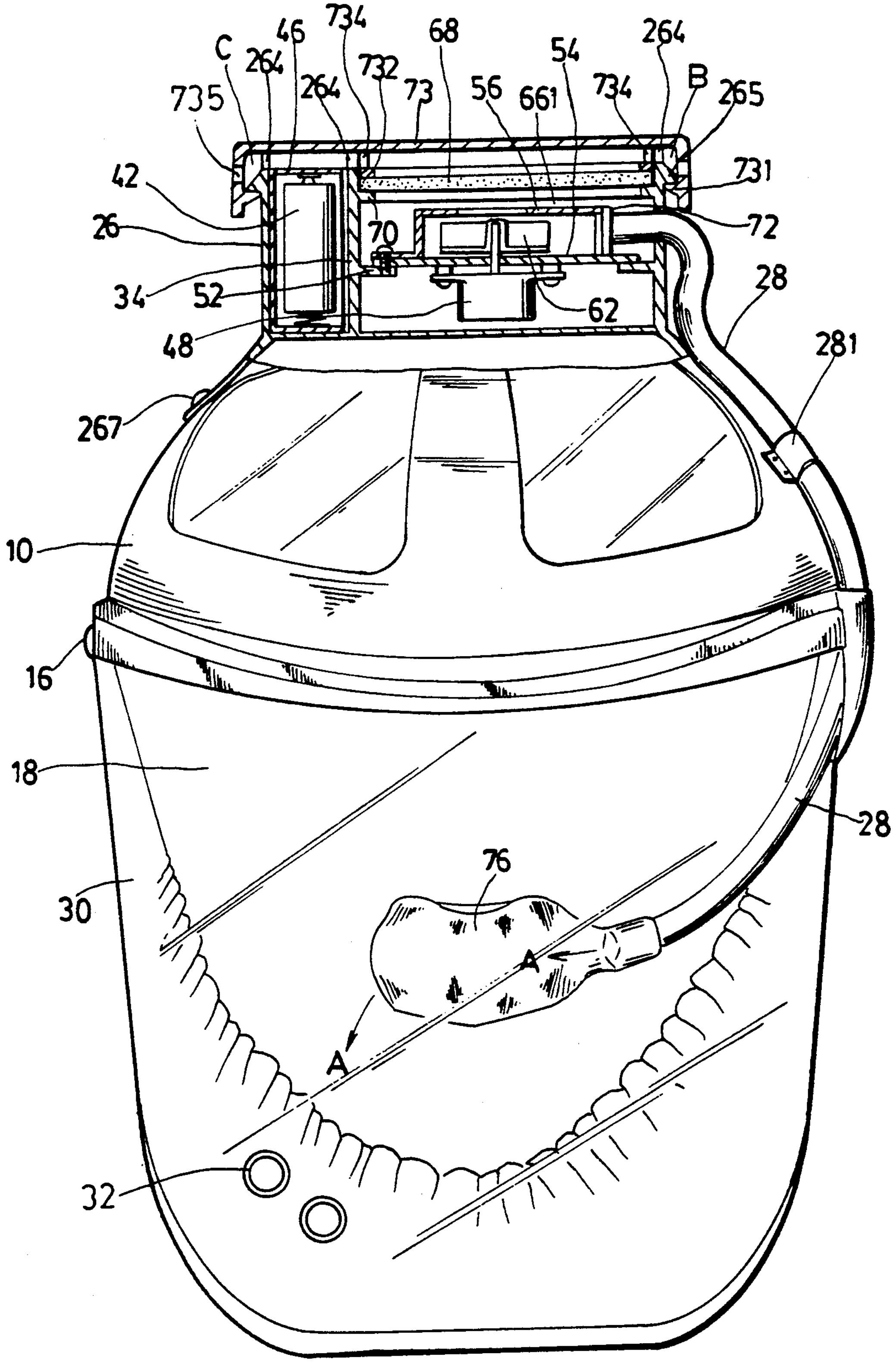
FIG. 1 is a front view of a mask with an air filtering device according to the present invention.
Figure 2:
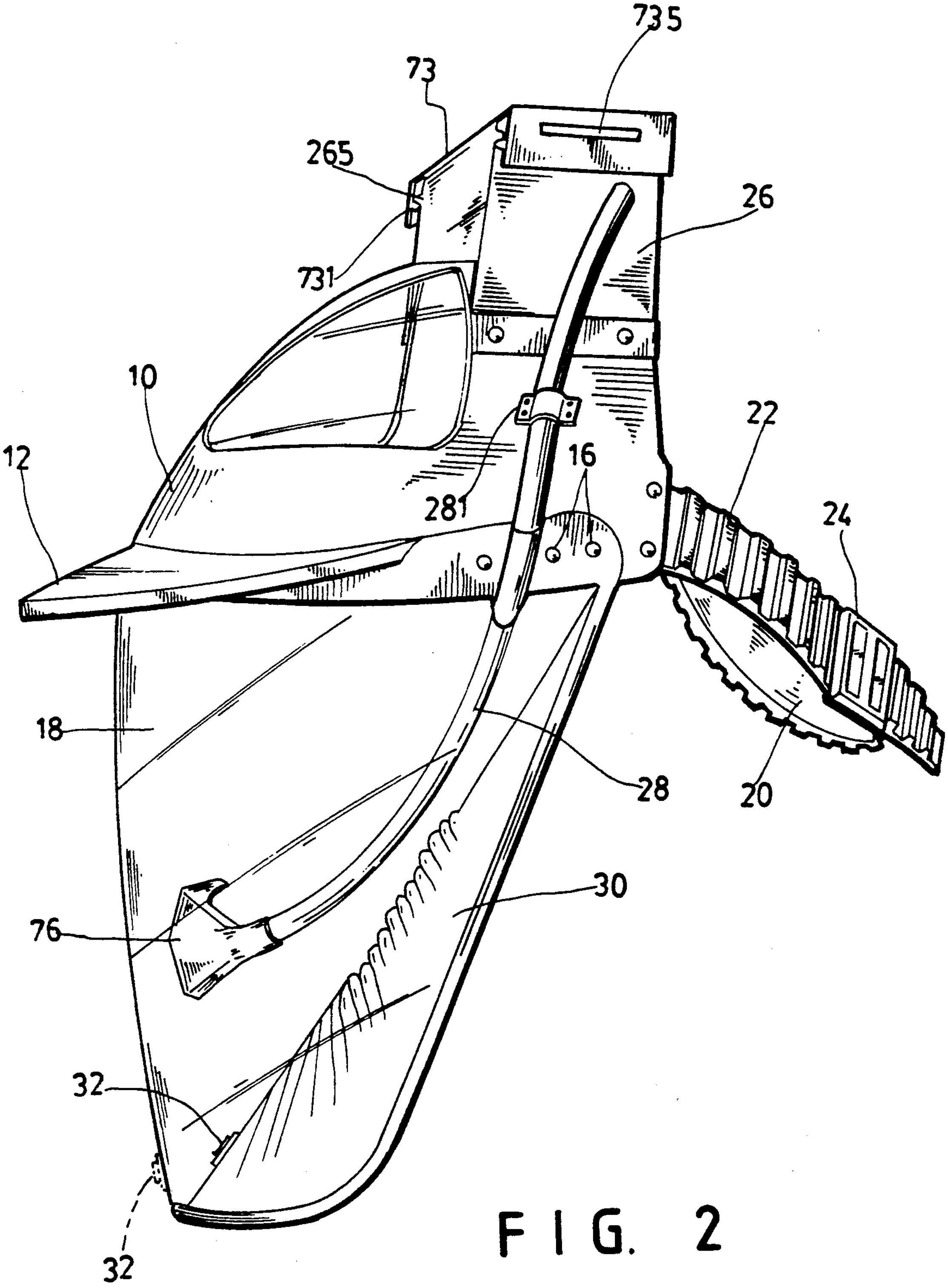
FIG. 2 is a side view of the mask with an air filtering device.

With reference to the drawings and in particular to FIGS. 1 through 4 thereof, the mask with air filtering device according to the present invention mainly comprises a helmet 10 which has brim 12 in the front. A visor 18 is engaged with the lower edge of the helmet 1 by two threads 14 and 16 at both sides. The visor 18 may be made wholly transparent or partially transparent as required. The helmet 10 is provided with two belts 20 and 20 at two rear sides which may be connected together by a buckle 24. On the top of the helmet 10 is mounted a filtering chamber 26 by threads 267. The filtering chamber 26 is designed to suck in the air from outside through two side inlets 735 of a cover 73, two entrances B and C, two side inlets 734 of a L-shaped member 732, three notches 264 of the filtering chamber 26, and a filtering plate 68 thus cleaning the air. A hard pipe 28 made of highly resilient material is connected with the filtering chamber 26 and the space behind the visor 18 so that the cleaned air may be transmitted from the filtering chamber 26 to the space behind the visor 18.

The lower and vertical sides of the visor 18 are provided with a soft pad 30 for closely fitting the face of a user so as to provide an appropriate sealing effect (but not an air tight effect). Either the soft pad 30 or the visor 18 is provided at the bottom with one or more check valves 32 (see FIG. 4).

Figure 7:
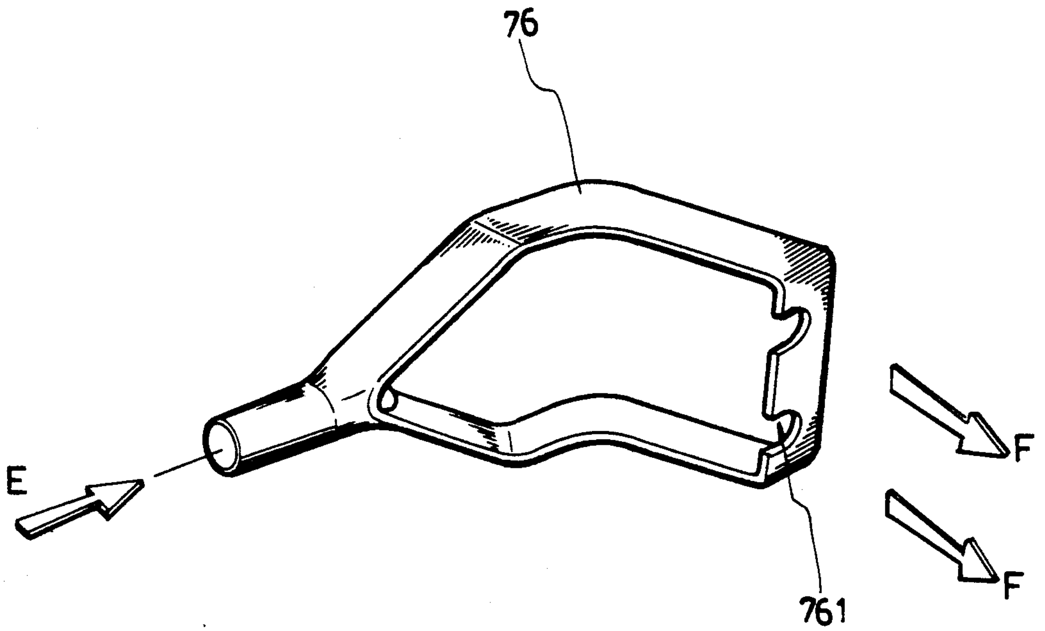
FIG. 7 is a perspective view of the air guider.
Figure 8:
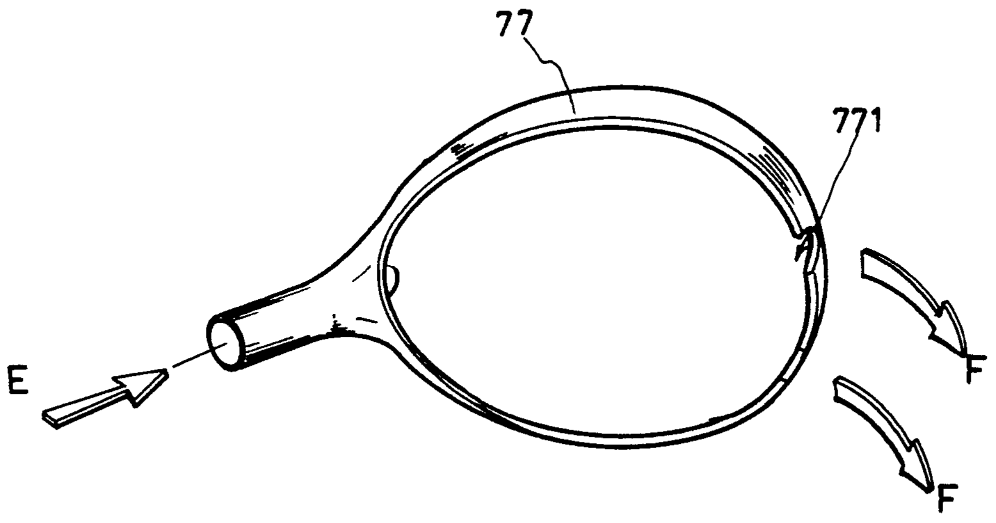
FIG. 8 is a perspective view of another preferred air guider.

The filtering chamber 26 is divided by a partition 34 into two enclosures 36 and 40. The former has a plurality of dry batteries or a container 46 for receiving rechargeable batteries 42 in its interior, while the latter is provided with a centrifugal blower 50 driven by a dc motor 48. The housing 56 and base 54 of the centrifugal blower 50 are mounted on a supporting frame 52 of the filtering chamber 26 by screws. The impeller 62 of the blower 50 is fixedly locked on the axle 64 of the dc motor 48. Further, the flange 481 of the dc motor 48 is threadedly fixed on the base 54 of the blower 50 and the power of the dc motor 48 is supplied by the battery 42 via a wire 481. In addition, the wire 481 has a switch for controlling the power supply to the dc motor 48. Between the blower 50 and the cover 73 is mounted the filtering plate 68 which may be made of non-fabric cloth, fibre, cotton, active carbon, negative ion, static dust collecting plate, or the like which are selected in accordance with the environment desired to be used. The filtering plate 68 is disposed on a frame 70 so as to keep a distance 661 from the blower 50 and increase the filtering effect of the filtering plate 68 and the air sucking ability of the blower 50. The pipe 28 extends through the side hole 261 into the inside of the visor 18 and near the mouth and nose of the user. The end of the pipe 28 is connected with a curved air guider 76 which is shown in FIGS. 7 and 8. As the pipe 28 is made of hard and highly resilient material, the curved air guider 76 can be kept at a fixed distance from the mouth and nose of the user (see K portion of FIG. 4). Referring to FIGS. 7 and 8, by means of the air guider 76 or 77, air may flow from an end E to the nose of the user and the air exhaled from the user may be transmitted to an end F. Since the air guider may converge the cleaned air near the mouth and nose of the user, the outside air cannot go near the mouth and nose of the user and will not be inhaled by the user even if it enters into the visor 18.

Figure 3:
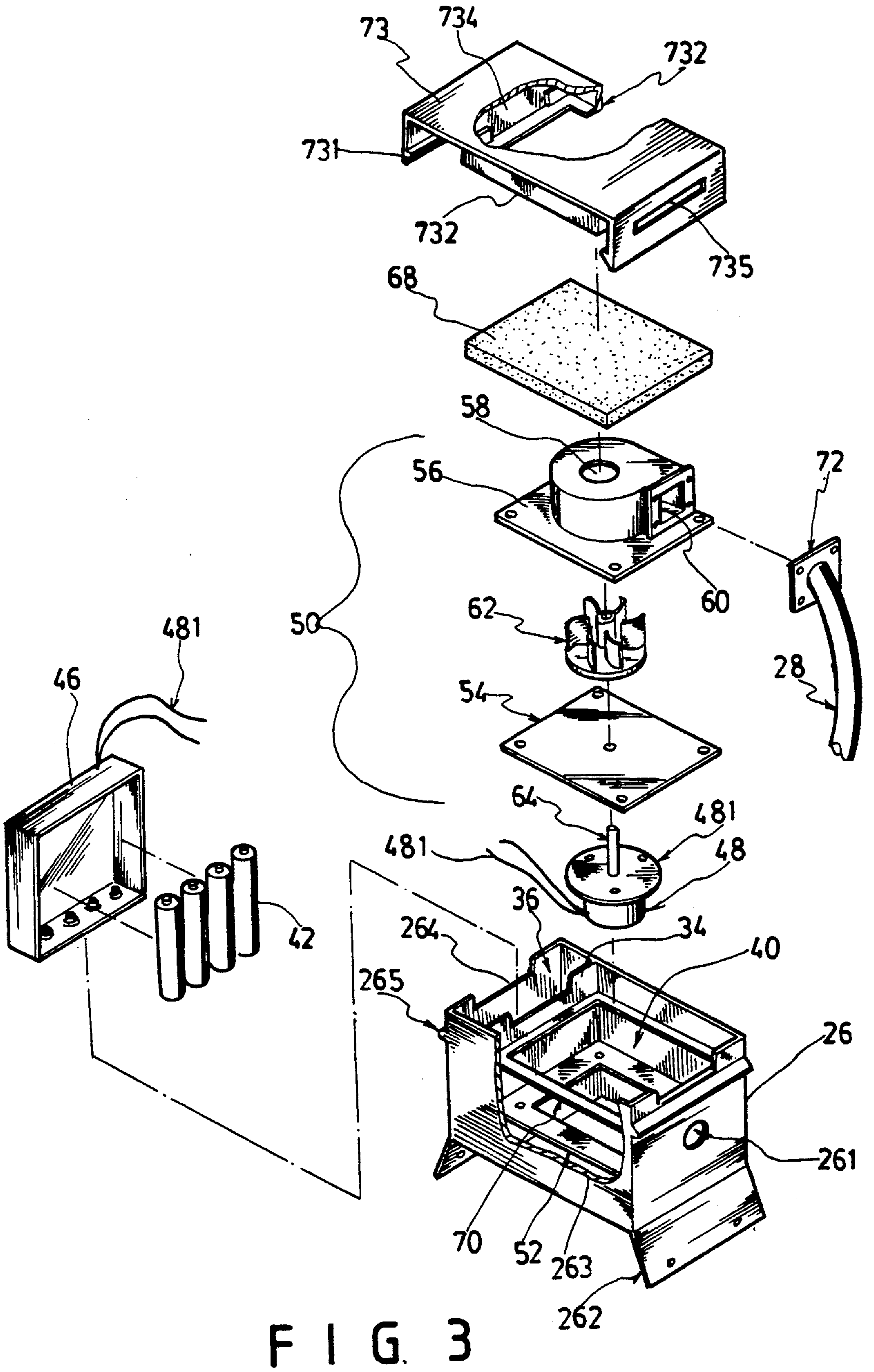
FIG. 3 is an exploded view of the mask with an air filtering device.

Looking now at FIGS. 1 and 3, the cover 73 of the filtering chamber 26 is provided with a L-shaped member 732 which utilizes the engagement between the protuberances 731 at two sides of the cover 73 and the protuberances 265 of the filtering chamber 26 to fix the filtering plate 68 therebetween. In the meantime, the cover 73 is firmly mounted on the filtering chamber 26 and the filtering plate 68 may be easily replaced as required.

Figure 4:
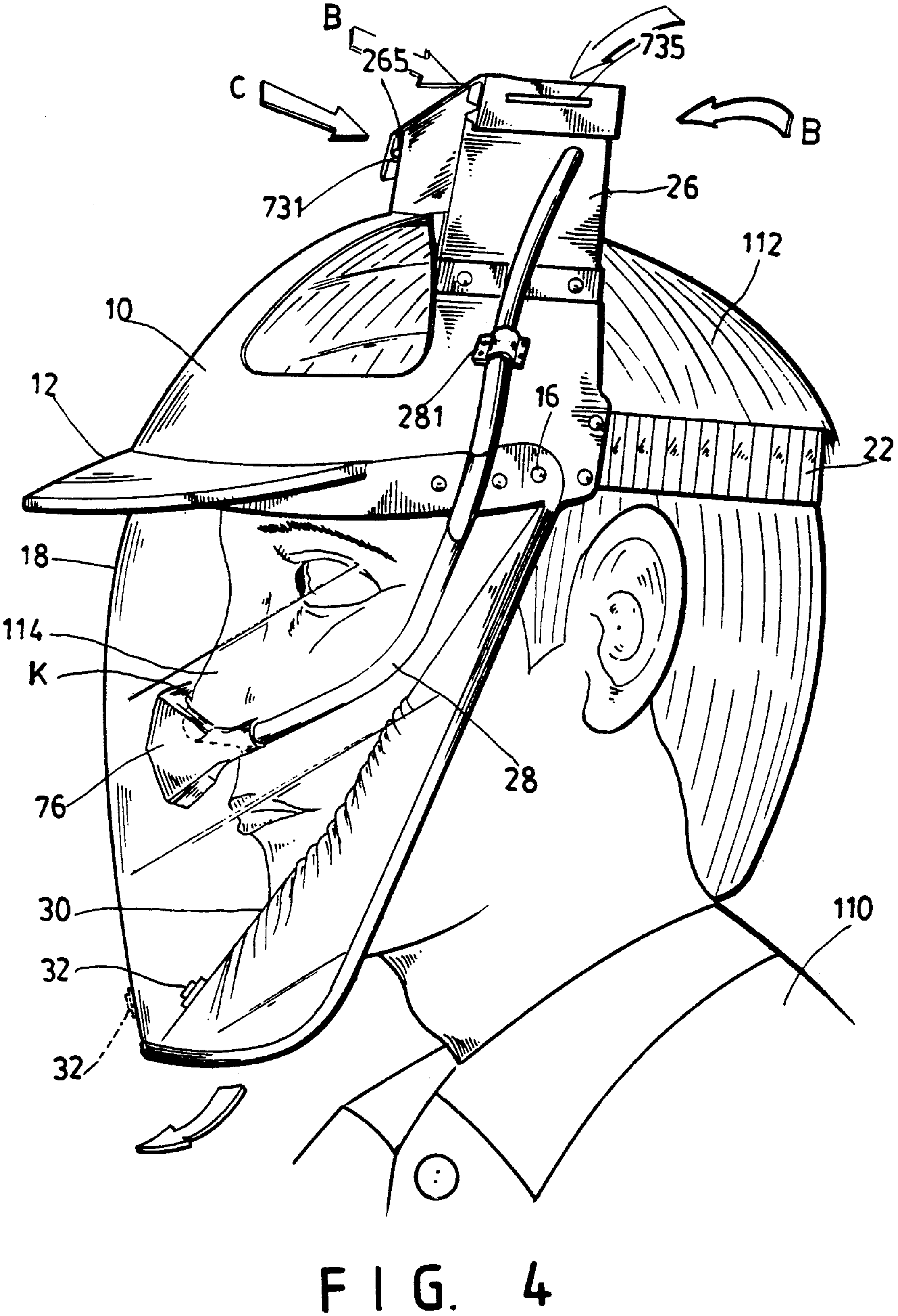
FIG. 4 is a working view of the mask with an air filtering device.
Figure 9:
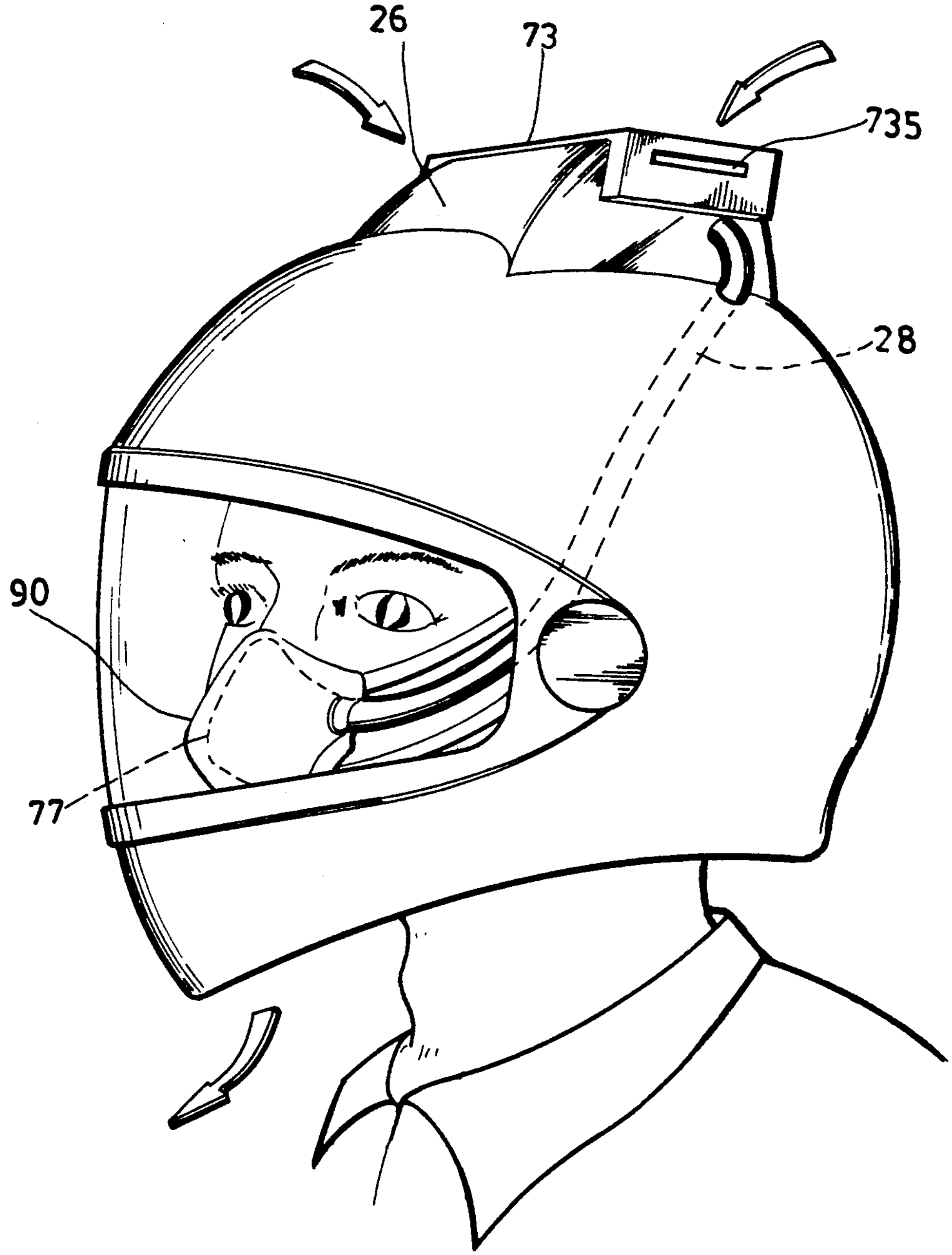
FIG. 9 is another working view of the mask with an air filtering device.

As illustrated in FIGS. 1 and 4, when an user 110 wears the present invention on his head 112, the outside polluted air cannot directly enter into the inside of the visor 18 because the soft pad 30 has a function to prevent air from going into inside of the visor 18. The outside air is first sucked in by the blower 50 driven by the motor 48. Then, the air flows through the inlets 735, the filtering plate 68, the air inlet 58, the housing 56 of the blower 50, the outlet 60, the pipe 28 and the air guider 76 and is transmitted a space 114 near the mouth and nose of the user 110. When the outside air passes through the filtering plate 68, the dust, carbon dioxide, lead oxide, or the like will be cleaned thereby supplying clean air to the user. It should be noted that the blower 50 may blow in more air than a man needs. Further, excess air may help exhaust the exhaled air out of the check valve 32. Besides, as there is always air flowing through the visor 18, there will be no obvious temperature difference inside the visor 18 and so there will be no vapor condensed thereon. In addition, the air guider 76 may be used with a cotton mask 90 (see FIG. 9) which may replace the air guider 76.

Figure 5:
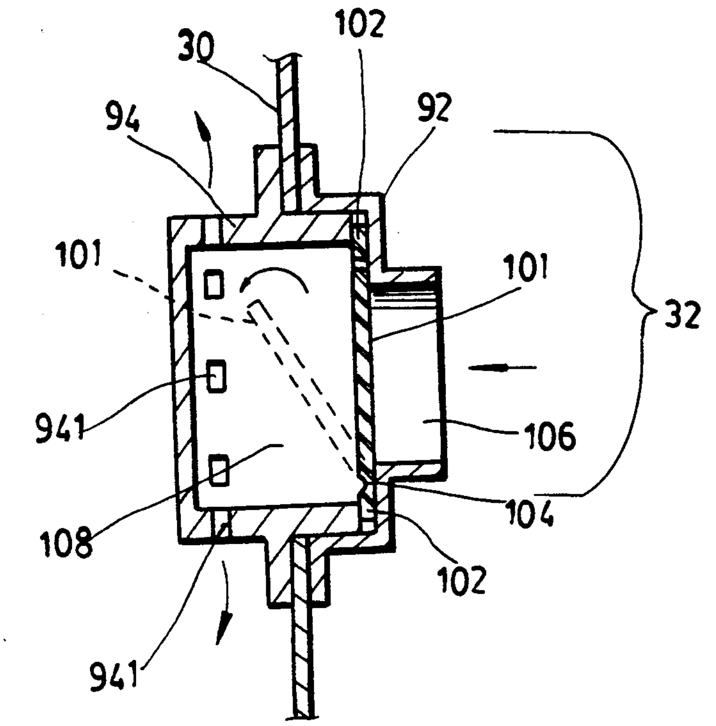
FIG. 5 is a sectional view of the check valve.
Figure 6B:
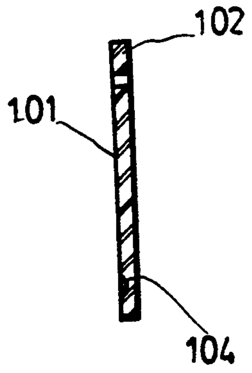
FIG. 6B is a side view of the exhausting diaphram.
Figure 6A:
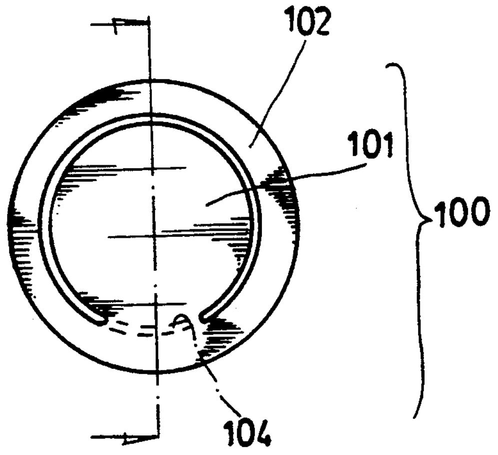
FIG. 6A is a front view of the exhausting diaphram.

Referring to FIG. 5, there is shown a sectional view of the check valve 32. As may be seen, the check valve 32 comprises an inner tubular member 92 and an outer tubular member 94 which are engaged together to clamp the soft pad 30 or the visor 18 and an outer flange 102 of an exhausting diaphram 100. The exhausting diaphram 100 utilizes a thin connecting plate 104 to join the outer flange 102 with the inner diaphram 101. When the user exhales, the pressure inside the visor 18 will be higher than that outside the visor 18 thereby pushing the inner diaphram 101 to go leftwards as shown in the dotted lines. Hence, the center holes 106 and 108 of the two tubular members 92 and 94 are in communication with each other and the air including exhaled air inside visor 18 may flow out of the holes 941 of the outer tubular member 94. When the user inhales, the pressure outside the visor 18 is higher than that inside the visor 18 thereby recovering the inner diaphram 101 to press the center hole of the inner tubular member 92. Further, as the exhausting diaphram 100 is made of highly resilient material, it will normally be in contact with the inner tubular member 92 and so that outside air will not be able to enter the visor 18 thus forming a check valve.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A mask with an air filtering device comprising:

helmet adapted to a head of a user;

a visor pivotally connected with a lower side of said helmet and having a soft pad for preventing air entering therein from outside;

a filtering chamber having a blower driven by a dc motor and a filtering plate mounted between said blower and a cover of said filtering chamber which includes an inlet;

a pipe connected at one end with an outlet of said blower and extending at the other to a space around mouth and nose of said user;

a curved air guider for converging cleaned air into the space around the mouth and nose of said user; and a check valve mounted on said soft pad for exhausting air exhaled by said user.

* * * * *